US012718516B2

(12) United States Patent
Wang et al.

(10) Patent No.: US 12,718,516 B2
(45) Date of Patent: Aug. 25, 2026

(54) SYSTEMS AND METHODS FOR GENERATING TARGET IMAGE SETS FROM SOURCE IMAGES USING NEURAL NETWORK ARCHITECTURES

(71) Applicant: Walmart Apollo, LLC, Bentonville, AR (US)

(72) Inventors: Zigeng Wang, Santa Clara, CA (US); Tong Yao, San Jose, CA (US); Jae Young Kim, Sunnyvale, CA (US); Wei Shen, Pleasanton, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 296 days.

(21) Appl. No.: 18/427,117

(22) Filed: Jan. 30, 2024

(65) Prior Publication Data

US 2025/0245959 A1 Jul. 31, 2025

(51) Int. Cl.

| | |
|---|---|
| ***G06V 10/46*** | (2022.01) |
| ***G06Q 30/0241*** | (2023.01) |
| ***G06T 3/4046*** | (2024.01) |

(52) U.S. Cl.

CPC ....... *G06V 10/462* (2022.01); *G06Q 30/0276* (2013.01); *G06Q 30/0277* (2013.01); *G06T 3/4046* (2013.01)

(58) Field of Classification Search

CPC ............. G06V 10/462; G06Q 30/0276; G06Q 30/0277; G06T 3/4046

See application file for complete search history.

(56) References Cited

U.S. PATENT DOCUMENTS

| | | | | |
|---|---|---|---|---|
| 10,937,033 | B1 | 3/2021 | Rodriguez et al. | |
| 2017/0193644 | A1 | 7/2017 | Fry | |
| 2017/0213248 | A1* | 7/2017 | Jing | G06T 7/30 |
| 2022/0207645 | A1* | 6/2022 | Kansara | H04N 7/0122 |
| 2023/0091549 | A1* | 3/2023 | Liu | G06V 10/462 382/100 |
| 2023/0206614 | A1* | 6/2023 | Ku | G06V 10/26 382/153 |
| 2024/0331214 | A1* | 10/2024 | Zhou | G06T 3/4046 |
| 2025/0156650 | A1* | 5/2025 | Depaolo | G06V 20/70 |

OTHER PUBLICATIONS

Cloudinary—Programmable Media., Retrieved from: https://cloudinary.com/products/programmable_media Cite Jan. 19, 2024.

(Continued)

*Primary Examiner* — Oneal R Mistry
*Assistant Examiner* — Jongbong Nah
(74) *Attorney, Agent, or Firm* — FOLEY & LARDNER LLP

(57) ABSTRACT

This disclosure relates to computer vision and generative artificial intelligence (AI) techniques for generating a target image set based on content included in a source image. The target image set comprises a plurality of target images, each of which is compliant with or more target display specifications for an electronic platform. The target images can be generated by an image adaptation network that comprises various AI models, including one or more saliency model, one or more generative models, one or more scene detection models, and/or one or more segmentation models.

20 Claims, 8 Drawing Sheets

(56) References Cited

OTHER PUBLICATIONS

AI Product Photography for E-commerce: Important Things You Need to Know., Retrieved from: https://claid.ai/blog/article/ai-product-photography/ Dec. 4, 2023.
TriCension-Feedback Loop in Generative AI., Retrieved from: https://www.tricension.com/domainai/feedback-loop-in-generative-ai/ Oct. 9, 2023.
Dennis, A., AI Outpainting: Top Tools for AI Image Outpainting Online. Retrieved from: https://repairit.wondershare.com/online-photo/ai-image-outpaiting-online.html Nov. 21, 2023.

* cited by examiner

SYSTEMS AND METHODS FOR GENERATING TARGET IMAGE SETS FROM SOURCE IMAGES USING NEURAL NETWORK ARCHITECTURES

TECHNICAL FIELD

This disclosure relates generally to neural network architectures that execute computer vision and/or generative artificial intelligence (AI) functions to create target image sets from source images.

BACKGROUND

In many scenarios, when an advertiser desires to place an electronic advertisement for display on a third-party electronic platform, the advertiser is faced with technical challenges related to ensuring the advertisement is able to be displayed properly across a plurality of display environments, each of which has its own dimension and resolution requirements. For example, the platform may display the electronic advertisement in a variety of fixed-size advertisement windows provided via a website and/or a mobile app associated with the electronic platform, and each of the advertisement windows may have heterogenous dimension and/or aspect ratio requirements. Further adding to these complexities, the specifications for rendering the electronic advertisement can vary across different types of operating systems and/or devices operated by customers, and across social media platforms.

Traditionally, a designer is required to manually design and create a multitude of images (e.g., ten, twenty, or more) for a single advertisement in order to accommodate the diverse dimension and resolution requirements across these and other display environments. This process of manually generating and designing multiple images for an individual advertisement is time-consuming and requires the designer to have technical knowledge of graphic design. Moreover, this problem is compounded in scenarios where the advertiser desires to create a collection of electronic advertisements, each requiring a multitude of corresponding images to accommodate the heterogenous image requirements for different display environments.

BRIEF DESCRIPTION OF THE DRAWINGS

To facilitate further description of the embodiments, the following drawings are provided in which.

Figure 1:
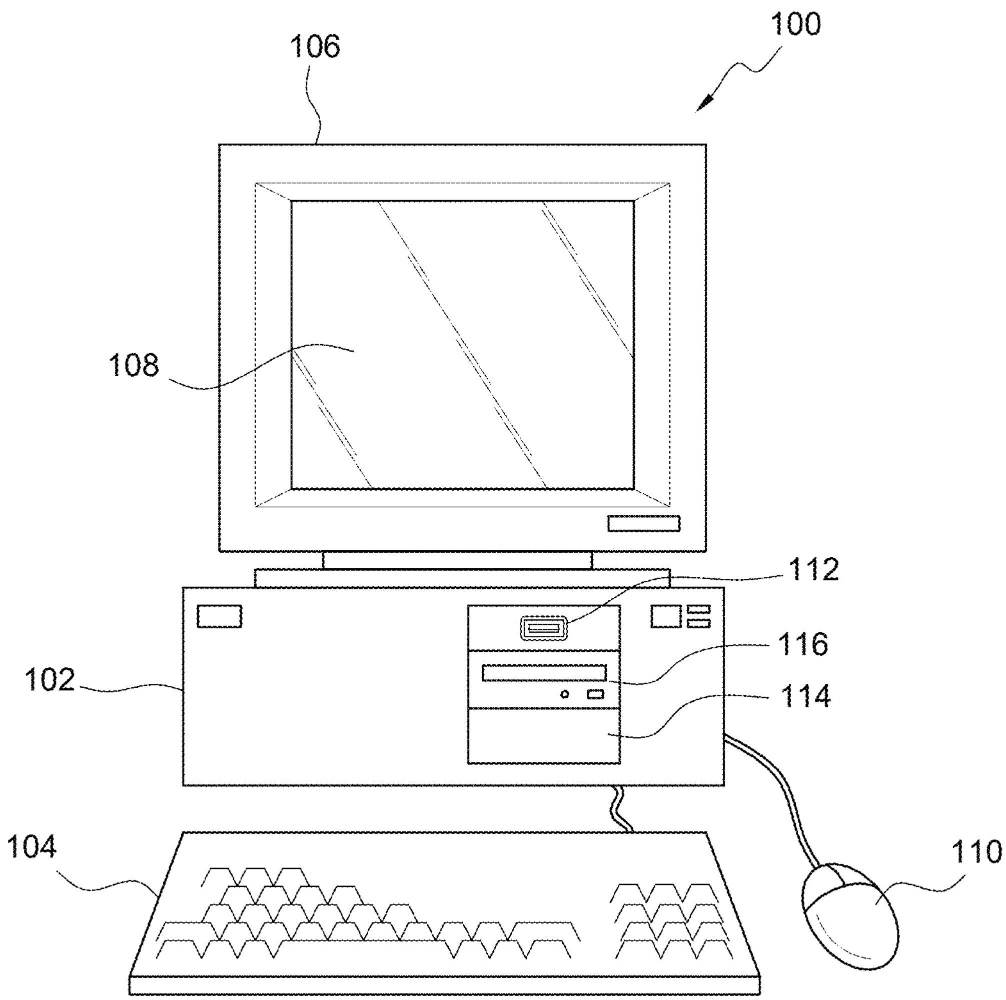
FIG. 1 illustrates a front elevational view of a computer system that is suitable for implementing various embodiments of the systems disclosed in FIGS. 3 through 6.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXEMPLARY EMBODIMENTS

A number of embodiments can include a system. The system comprises one or more processors and one or more non-transitory computer-readable storage devices that store computing instructions that when executed on the one or more processors, cause the one or more processors to perform functions comprising: receiving a source image corresponding to an electronic advertisement; receiving a plurality of target display specifications; generating, using an image adaptation network, a target image set for the electronic advertisement that comprises target images compliant with each of the target display specifications, wherein generating the target image set comprises: (a) analyzing, using a saliency model of the image adaptation network, the source image to detect a salient feature region in the source image; and (b) generating target images for the target image set based, at least in part, on the salient feature region detected in the source image such that each of the target images is compliant with at least one of the plurality of target display specifications; and storing the target image set to enable the electronic advertisement to be displayed according to each of the plurality of target display specifications.

Various embodiments include a method. The method can be implemented via execution of computing instructions configured to run at one or more processors and configured to be stored at non-transitory computer-readable media The method can comprise: receiving a plurality of target display specifications; generating, using an image adaptation network, a target image set for the electronic advertisement that comprises target images compliant with each of the target display specifications, wherein generating the target image set comprises: (a) analyzing, using a saliency model of the image adaptation network, the source image to detect a salient feature region in the source image; and (b) generating target images for the target image set based, at least in part, on the salient feature region detected in the source image such that each of the target images is compliant with at least one of the plurality of target display specifications; and storing the target image set to enable the electronic advertisement to be displayed according to each of the plurality of target display specifications.

Figure 2:
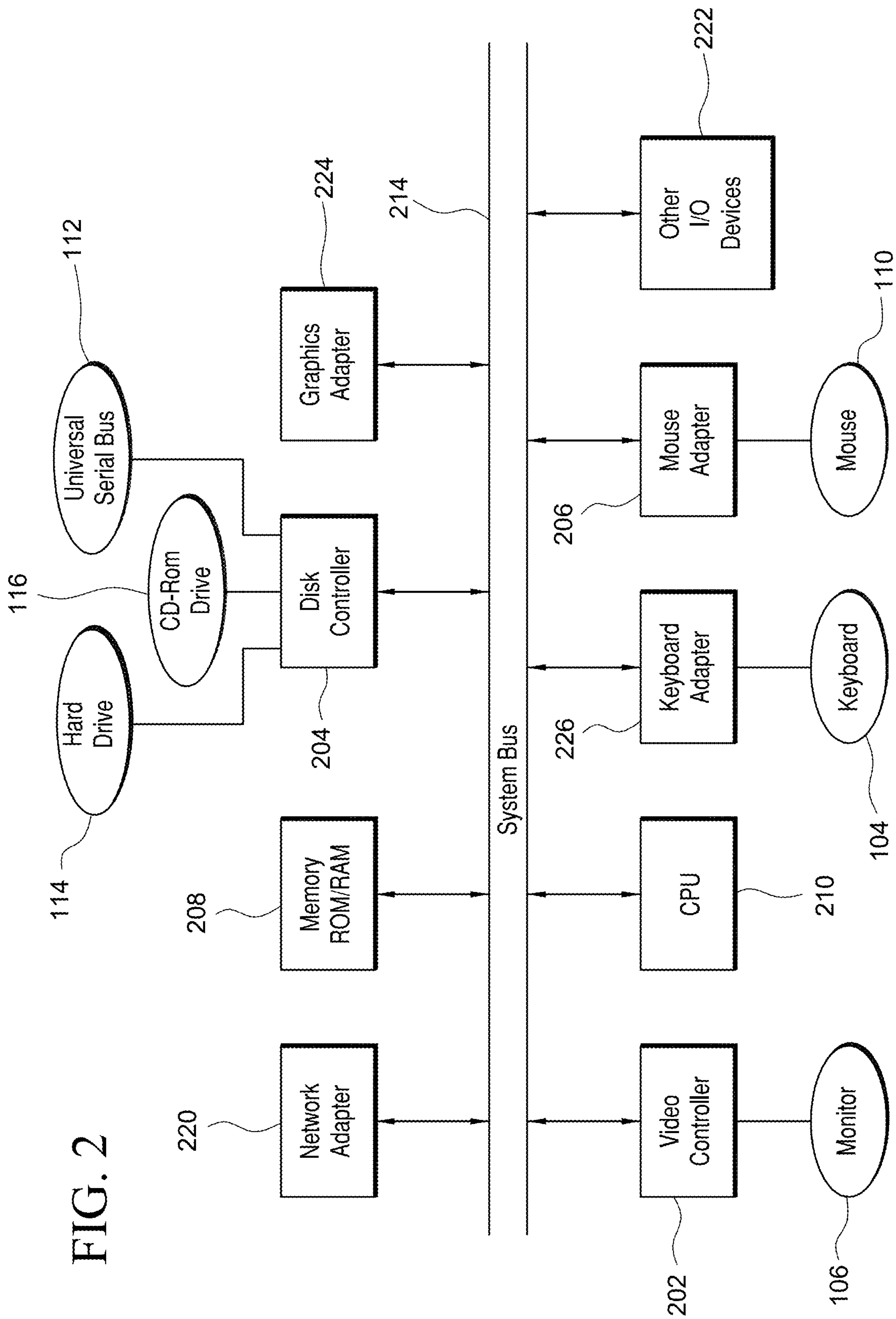
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
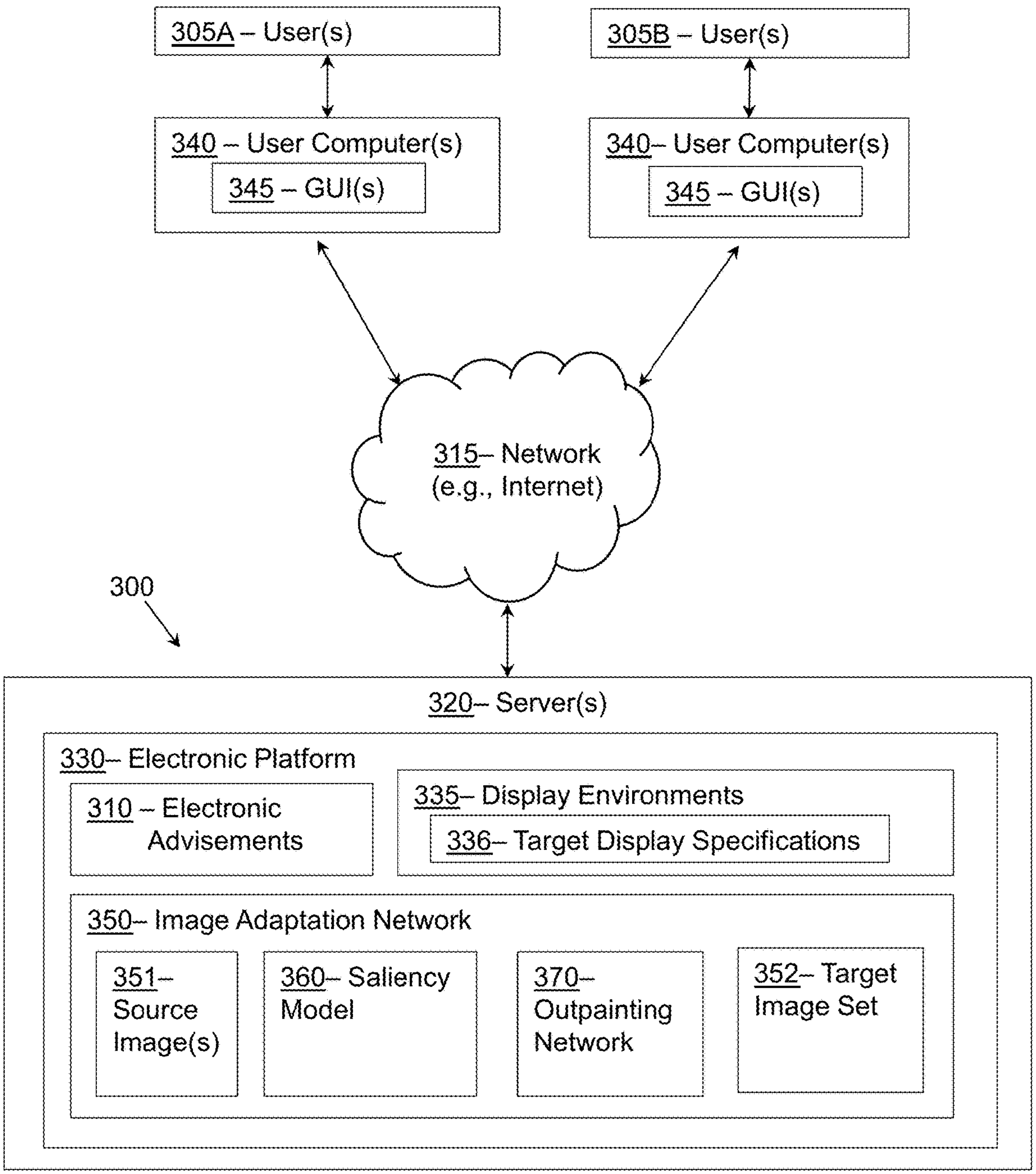
FIG. 3 illustrates a representative block diagram of a system, according to an embodiment.

Turning ahead in the drawings, FIG. 3 illustrates a block diagram of a system 300 that can be utilized to generate a target set of images, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include one or more servers 320, one or more electronic platforms 330, and/or one or more image adaptation networks 350. Each of the servers 320, electronic platforms 330, and image adaptation networks 350 can each be a computer system, such as computer system 100 (FIG. 1), as described above, and can each be a single computer, a single server, or a cluster or collection of computers or servers, or a cloud of computers or servers. In another embodiment, a single computer system can host each of two or more of servers 320, electronic platforms 330, and image adaptation networks 350. Additional details regarding exemplary servers 320, electronic platforms 330, and image adaptation networks 350 are described herein.

In many embodiments, system 300 also can comprise user computers 340. User computers 340 can comprise any of the elements described in relation to computer system 100. In some embodiments, user computers 340 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In many embodiments, system 300 can comprise graphical user interfaces ("GUIs") 345. In the same or different embodiments, GUIs 345 can be part of and/or displayed by computing devices associated with system 300 and/or user computers 340, which also can be part of system 300. In some embodiments, GUIs 345 can comprise text and/or graphics (images) based user interfaces. In the same or different embodiments, GUIs 345 can comprise a heads up display ("HUD"). When GUIs 345 comprise a HUD, GUIs 345 can be projected onto glass or plastic, displayed in midair as a hologram, or displayed on monitor 106 (FIG. 1). In various embodiments, GUIs 345 can be color or black and white. In many embodiments, GUIs 345 can comprise an application running on a computer system, such as computer system 100, user computers 340, and/or servers 320. In the same or different embodiments, GUI 345 can comprise a website accessed through network 315 (e.g., the Internet). In some embodiments, GUI 345 can comprise an eCommerce website. In the same or different embodiments, GUI 345 can be displayed as or on a virtual reality (VR) and/or augmented reality (AR) system or display.

In some embodiments, server 320 can be in data communication through network 315 (e.g., the Internet) with user computers (e.g., 340). In certain embodiments, the network 315 may represent any type of communication network, e.g., such as one that comprises the Internet, a local area network (e.g., a Wi-Fi network), a personal area network (e.g., a Bluetooth network), a wide area network, an intranet, a cellular network, a television network, and/or other types of networks. In certain embodiments, user computers 340 can be desktop computers, laptop computers, smart phones, tablet devices, and/or other endpoint devices. Server 320 can host one or more websites. For example, server 320 can include a web server and/or can host an eCommerce website that allows users to browse and/or search for products, to add products to an electronic shopping cart, and/or to purchase products, in addition to other suitable activities.

In many embodiments, servers 320, electronic platforms 330, and image adaptation networks 350 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of servers 320, electronic platforms 330, and image adaptation networks 350 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of servers 320, electronic platforms 330, and image adaptation networks 350. In a similar manner, the processing module(s) and the memory storage module(s) can be local and/or remote to each other.

In many embodiments, servers 320, electronic platforms 330, and image adaptation networks 350 can be configured to communicate with one or more user computers 340. In some embodiments, user computers 340 also can be referred to as customer computers. In some embodiments, servers 320, electronic platforms 330, and image adaptation networks 350 can communicate or interface (e.g., interact) with one or more customer computers (such as user computers 340) through a network 315 (e.g., the Internet). Network 315 can be an intranet that is not open to the public. Accordingly, in many embodiments, servers 320, electronic platforms 330, and image adaptation networks 350 (and/or the software used by such systems) can refer to a back end of system 300 operated by an operator and/or administrator of system 300, and user computers 340 (and/or the software used by such systems) can refer to a front end of system 300 used by one or more users (305A, 305B), respectively. In some embodiments, users 305B can also be referred to as customers, in which case, user computers 340 can be referred to as customer computers. In some embodiments, the users 305A also can be referred to as advertisers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, servers 320, electronic platforms 330, and image adaptation networks 350 also can be configured to communicate with one or more databases. The one or more databases can comprise a product database that includes information about products, items, or SKUs (stock keeping units) sold by a retailer and/or an advertisement database that includes electronic advertisements 310 that are displayed by the electronic platform 330. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between servers 320, electronic platforms 330, and image adaptation networks 350, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Figure 4:
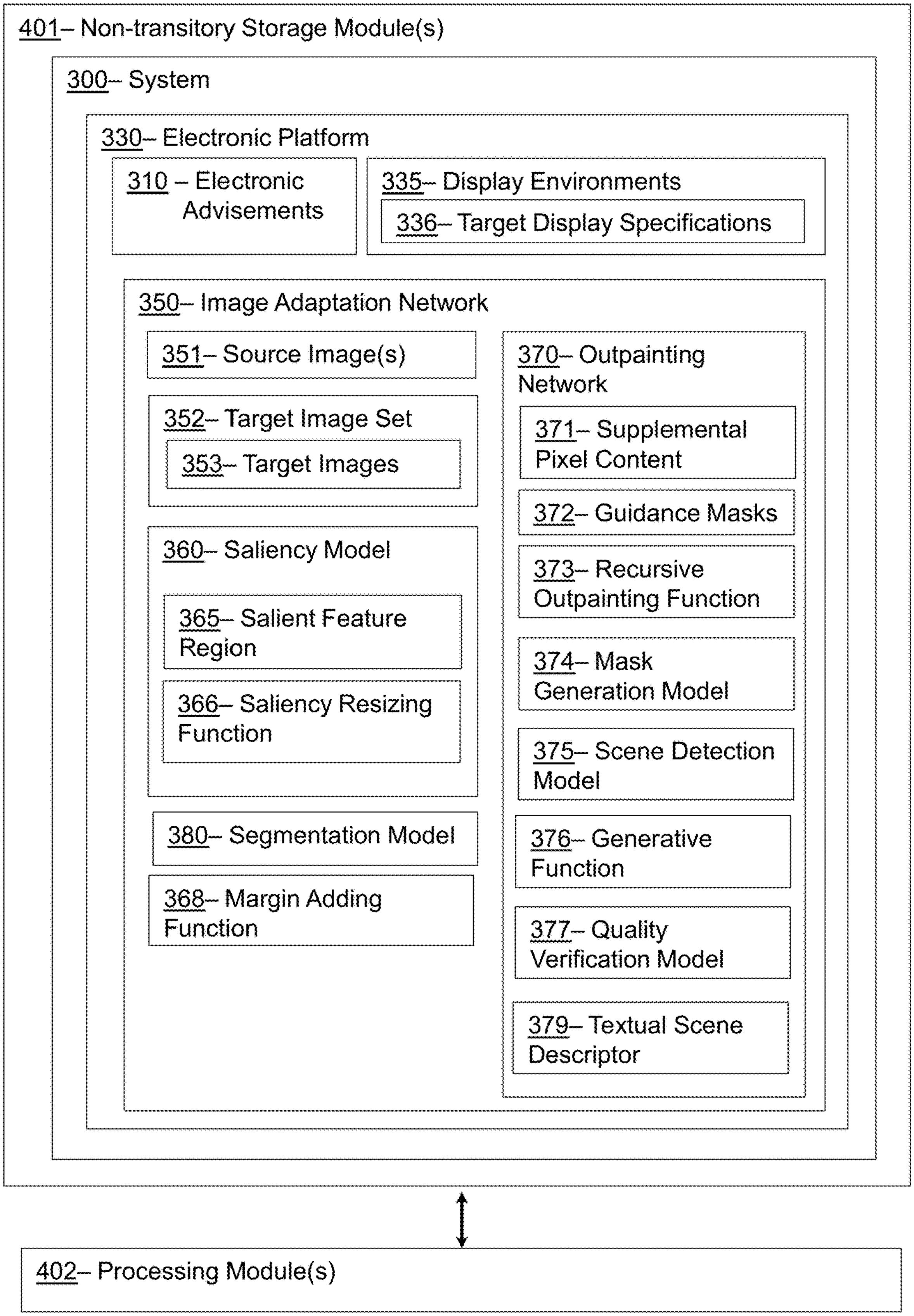
FIG. 4 illustrates a representative block diagram of a portion of the system of FIG. 3, according to an embodiment.

FIG. 4 is a block diagram illustrating a detailed view of a portion of system 300 in accordance with certain embodiments. The system 300, as shown in FIG. 4, includes one or more non-transitory storage modules 401 that are in communication with one or more processing modules 402. The one or more non-transitory storage modules 401 can include: (i) non-volatile memory, such as, for example, read-only memory (ROM) or programmable read-only memory (PROM); and/or (ii) volatile memory, such as, for example, random access memory (RAM), dynamic RAM (DRAM), static RAM (SRAM), etc. In these or other embodiments, storage modules 401 can comprise (i) non-transitory memory and/or (ii) transitory memory. The one or more processing modules 402 can include one or more central processing units (CPUs), graphical processing units (GPUs), controllers, microprocessors, digital signal processors, and/or computational circuits. The one or more storage modules 401 can store data and instructions corresponding to the functionalities of the electronic platform 330 and/or image adaptation network 350 described herein. The one or more processing modules 402 can be configured to execute any and all instructions associated with implementing the functions performed by the electronic platform 330 and/or image adaptation network 350 (or components associated with the electronic platform 330 and/or image adaptation network 350).

With reference to FIGS. 3 and 4, the discussion below describes exemplary functionalities and configurations of system 300, electronic platform 330, and image adaptation network 350.

In some examples, the electronic platform 330 may represent an eCommerce website or platform having an online marketplace that enables users 305B (e.g., which may be referred to herein as "customer users") to browse, view, purchase, and/or order items via the electronic platform 330. In other examples, the electronic platform 330 may represent a digital content provider that enables the customer users 305B to access various types of digital content (e.g., content such as news articles, videos, images, audio, streaming services, etc.). In other examples, the electronic platform 330 may represent a social media platform that enables the customer users 305B to create, share, and view various type of electronic content (e.g., posts, images, videos, etc.) in a virtual community. The electronic platform 330 can be configured with many other types of functionalities other than those explicitly mentioned above.

Regardless of functionalities or content provided by the electronic platform 330, certain users 305A (e.g., which may be referred to herein as "advertiser users") may operate user computers 340 to advertise products and/or services via the electronic platform 330. The content of these electronic advertisements 310 can vary significantly and, in some examples, may correspond to products and/or services offered by a company, individual, or other entity. Each of the electronic advertisements 310 may be stored in one or more databases associated with the electronic platform 330 along with corresponding metadata (e.g., metadata including an advertisement name, an advertisement description, a product or service category associated with the advertisement, one or more images/videos corresponding to the advertisement, a name or identifier of an advertiser associated with the advertisement, a name or identifier of an advertising campaign associated with the advertisement, and/or other data related to the advertisements 310).

In certain embodiments, customer users 305B may operate user computers 340 to access products, services, and/or content provided by the electronic platform 330. While accessing the electronic platform 330, the customer users 305B may be presented with electronic advertisements 310 and, if desired, the customer users 305B may select the electronic advertisements 310 to access details and/or place orders for products, services, or content associated with the advertisements 310.

The electronic advertisements 310 may be presented to the customer users 305B in a variety of display environments 335. In some examples, a display environment 335 may refer to, or include, an electronic environment, such as a website, mobile app, and/or desktop application affiliated with the electronic platform 330, that renders or outputs the electronic advertisements 310 submitted to the electronic platform 330. In further examples, a display environment 335 may refer to, or include, an advertising window that is provided on the website, mobile app, and/or desktop application affiliated with the electronic platform 330, which renders or outputs the electronic advertisements 310. Each advertising window may represent a fixed-sized or variable-sized region of a GUI 345 on a web page and/or application interface that is configured to output or render electronic advertisements 310, and the content of the advertising window may be constantly updated to reflect different electronic advertisements 310. In many scenarios, each of the website, mobile app, and/or desktop application may provide multiple advertising windows. In further examples, a display environment 335 may refer to, or include, an operating system (e.g., iOS®, Android®, etc.) and/or device type (e.g., Apple® device, Samsung® device, etc.) of a user computer 340 on which the electronic advertisements 310 may be rendered or displayed. In further examples, a display environment 335 may refer to, or include, social media accounts affiliated with the electronic platform 330 through which the electronic advertisements 310 may be rendered or displayed.

Each of the display environments 335 may be associated with target display specifications 336, which identify an aspect ratio and/or dimensions for displaying an electronic advertisement 310 in a corresponding display environment 335, and the display specifications 336 may be stored on the electronic platform 330. The target display specifications 336 can vary significantly across the different display environments 335. For example, a single web page or website may include multiple advertising windows, each of which displays an electronic advertisement 310 according to a different aspect ratio (e.g., 1:1, 16:9, 4:3, 5:1, etc.) or according to different dimensions (e.g., 728×90, 300×250, 250×250, etc.). Similarly, the aspect ratio or dimensions for an advertising window on a web page can be starkly different from the aspect ratio or dimensions for an advertising window on a mobile application or social media application.

To accommodate the diverse display specifications 336 across the various display environments 335, an advertiser user 305A typically is required to manually generate and submit a multitude of images (e.g., ten, twenty, or more) to the electronic platform 330 for a single electronic advertisement 310, each of which is designed to be output in a particular display environment 335 and/or in compliance with display specifications 336 corresponding to a display environment 335. This process of manually designing multiple images for each individual advertisement is time-consuming and requires a designer that has technical knowledge of graphic design. Moreover, this problem is exacerbated in scenarios where the advertiser desires to create a collection of advertisements, each of which will require a multitude of corresponding images to accommodate the heterogenous display specifications 336 across diverse display environments 335.

In view of the foregoing, it is desirable to configure the electronic platform 330 with functionality that enables an advertiser user 305A to submit a single image for an electronic advertisement 310, which can be used as a basis for automatically generating a collection of images that satisfy all target display specifications 336 and that can be rendered across all display environments 335 associated with the electronic platform 330.

One potential solution for automating the generation of multiple images from a single advertising image is to apply a direct rescaling function on the single image to satisfy the display specifications 336 across multiple display environments 335. However, this technique often distorts the content in the generated images and diminishes the appearance of the images.

Another potential solution is for automating the generation of multiple images from a single advertising image is to apply a centroid cropping function that uses a single image to generate multiple images by cropping the image based on a centroid of an object in the image. However, this technique often results in the loss of important image content for the advertisement.

To overcome the aforementioned problems (and/or other technical challenges), the electronic platform 330 can include an image adaption network 350 that is configured to receive a single source image 351 for an electronic advertisement 310, and utilize the source image 351 to generate a target image set 352 that is compliant with all display specifications 336 across the diverse display environments 335 associated with the electronic platform 330. The target image set 352 generated by the image adaption network 350 comprises a plurality of target images 353, each of which satisfies, or is in compliance with, the one or more display specifications 336 in one or more display environments 335. For example, each target image 353 included in the target image set 352 can be generated according to a specific aspect ratio and/or according to specific dimensions associated with a target display specification 336. A separate target image 353 can be generated to satisfy each of the display specifications 336 on the electronic platform to ensure that the electronic advertisement 310 is capable of being output in all display environments 335.

When a request is received to display the electronic advertisement 310 on a user computer 340 (e.g., when a customer user 305B is accessing the electronic platform 330), the electronic platform 330 can determine the display environment 335 in which the electronic advertisement 310 will be displayed, as well as the target display specifications 336 associated with rendering or displaying the electronic advertisement 310 in the display environment 335. Additionally, the electronic platform 330 can select an appropriate target image 353 included in the target image set 352 that is compliant with the display specifications 336 and/or display environment 335, and transmit the target image 353 over a network 315 to the user computer 340 for output in the corresponding display environment 335.

The manner in which the image adaptation network 350 generates the target image set 352 can vary. In many examples described below, the image adaption network 350 may include a saliency model 360 that assists with generating some or all of the target images 353 included in the target image set 352. In particular, the saliency model 360 may include a neural network model that is trained to identify or detect a salient feature region 365 in a source image 351 corresponding to an electronic advertisement 310. In general, the salient feature region 365 of a source image 351 refers to an area or region of the source image 351 that includes the most important content and/or visually prominent objects that are the subject of the electronic advertisement 310 corresponding to the source image 351. In some exemplary configurations, the saliency model 360 can detect the salient feature region 365 in the source image 351, at least in part, by identifying prominent or salient features or objects within the source image 351 that have unique characteristics (e.g., corners, edges or spatial structures) and/or that stand out from surrounding image content.

The configuration of the saliency model 360 can vary. In some examples, the saliency model 360 can be implemented using one or more versions of an InSPyReNet (Inverse Saliency Pyramid Reconstruction Network) model. Additionally, or alternatively, the saliency model 360 can be implemented using one or more versions of a SAM (Segment Anything Model) model. Other models capable of detecting salient features, objections, or regions in images also can be used.

Regardless of its implementation, the saliency model 360 can be configured to receive a source image 351 as an input, analyze the content of the source image 351, and generate an output identifying the salient feature region 365 of the source image 351. As described in further detail below, the salient feature region 365 of the source image 351 can be utilized to generate some or all of the target images 353 included in the target image set 352.

In certain embodiments, the saliency model 360 includes, or communicates with a saliency resizing function 366, that is configured to crop and/or resize the source image 351 using the salient feature region 365. In some examples, the saliency resizing function 366 receives both the source image 351 and the salient feature region 365 identified in the source image 351, and generates a target image 353 by cropping the source image in a manner that preserves the salient feature region 365. In some embodiments, additional image processing techniques may be applied to cropped image to resize, scale, or otherwise adapt the image to fit aspect ratios and/or dimensions of one or more target display specifications 336. Once finalized, the image can be saved as a target image 353 in the target image set 352 for usage in presenting electronic advertisements 310 to customers users 305B.

In some scenarios, the aspect ratio of cropped image (which includes the salient feature region 365 extracted from the source image 351) may be significantly different from the aspect ratio for a desired target image 353 (e.g., in a scenario where the source image 351 or salient feature region 365 has an aspect ratio of 1:1 and the target image 353 has an aspect ratio of 5:1). In these scenarios, it may be difficult or impossible to generate an acceptable target image 353 only by resizing or fitting the salient feature region 365 to the target display specifications 336.

To address the aforementioned challenge, the image adaptation network 350 may further include an outpainting network 370 that is configured to generate supplemental pixel content 371 for target images 353 in the above scenarios where there are extreme differences between aspect ratios of the cropped image and the desired target image 353. Supplementing the content of salient feature region 365 (or cropped image containing the salient feature region 365) can enable the image adaptation network 350 to generate target images 353 having extreme aspect ratio requirements while ensuring the salient feature region 365 is incorporated into the target image 353 in an aesthetically pleasing fashion (and without distorting the salient feature region 365 or excessively rescaling the salient feature region 365).

The configuration of the outpainting network 370 can vary. In some examples, the outpainting network 370 can include using one or more generative models, such as a Stable Diffusion v2 model and/or an Imagen model developed by Google®. Other models capable of generating pixel or image content also may be utilized.

In some examples, the outpainting network 370 may receive the resized or cropped salient feature region 365 output by the saliency resizing function 366, and generate supplemental pixel content 371 for extending the scene or content of the salient feature region 365 in a horizontal and/or vertical direction. To guide the generative model in generating supplemental pixel content 371, one or more guidance masks 372 can be created. The one or more guidance masks 372 can identify a region where the salient feature region 365 is located and regions where supplemental pixel content 371 should be generated for the target image 353. Additionally, the one or more guidance masks 372 can provide color scheme information that is used by the generative model to generate the supplemental pixel content 371 in a manner that is visually consistent with the content of the salient feature region 365 (e.g., which naturally extends the scene of the salient feature region 365). In some embodiments, the outpainting network 370 may execute a recursive outpainting function 373 that iteratively generates the supplemental pixel content 371 in an iterative fashion on a piece-by-piece basis. Further details of exemplary outpainting techniques and network configurations are described in further detail below (see FIGS. 6, 7A and 7B).

Figure 5:
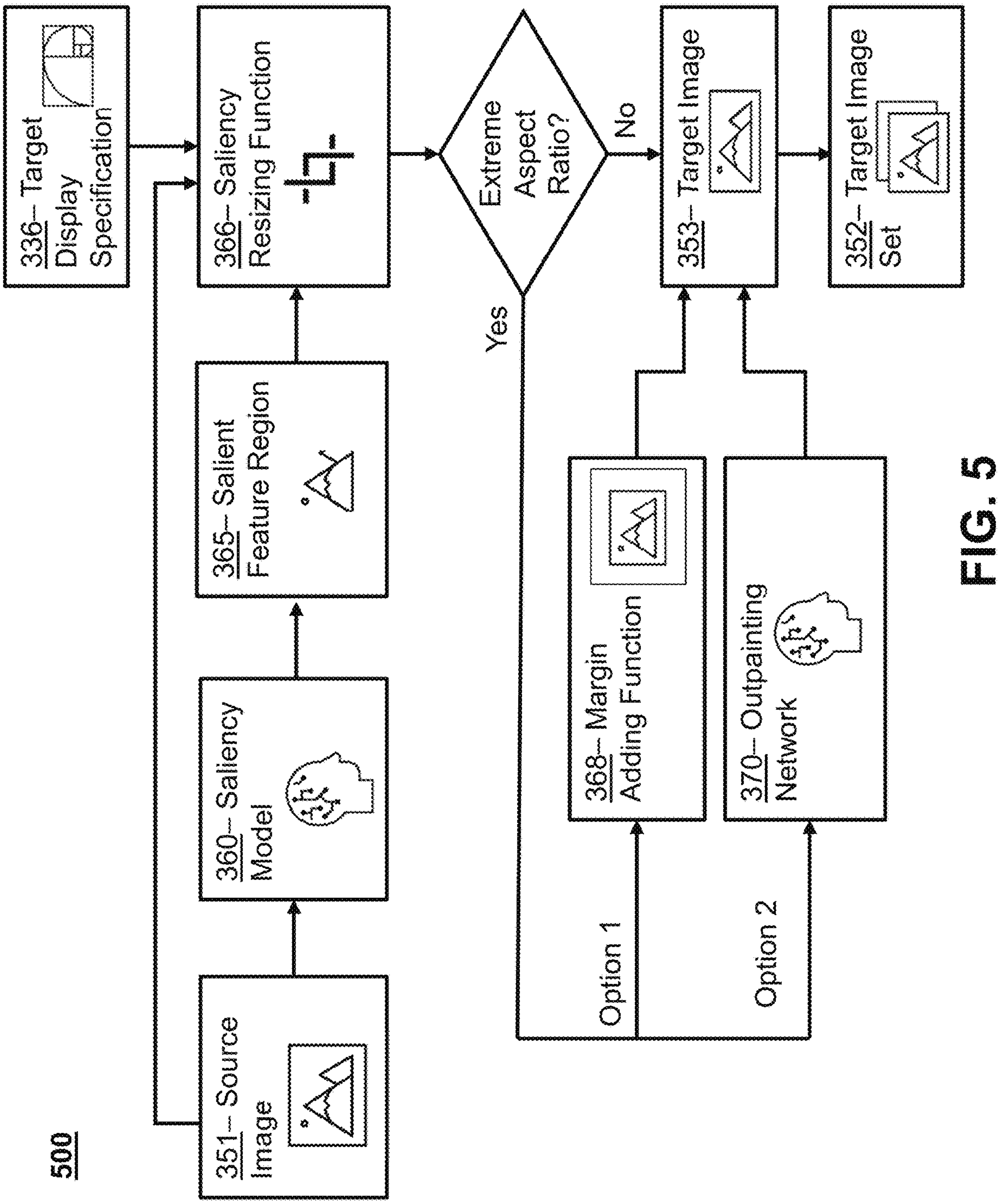
FIG. 5 is a diagram illustrating a process flow for generating target image sets according to an embodiment.

FIG. 5 is a diagram illustrating an exemplary process flow 500 for generating target image sets 352 according to certain embodiments. The process flow 500 outputs a target image 352 for inclusion in the target image set 352. The process flow 500 can be repeated continuously until the target image set 352 includes target images 353 satisfying all target display specifications 336.

Initially, a source image 351 is received by a saliency model 360 for analysis. The source image 351 may correspond to an electronic advertisement 310 that is submitted to the electronic platform 330 by an advertising user. The saliency model 360 executes one or more computer vision functions to analyze and/or understand the content of the source image 351. The saliency model 360 generates an output identifying a salient feature region 365 in the source image 351 based on this analysis.

A saliency resizing function 366 receives a target display specification 336 for a target image 353 to be created by the outpainting network 370. The target display specification 336 may identify a desired aspect ratio and/or dimensions for the target image 353. The saliency resizing function 366 additionally receives the source image 351 and the salient feature region 365, and crops the source image 351 in a manner that preserves the salient feature region 365.

Next, a determination is made as to whether the cropped image output by the saliency resizing function 366 has an aspect ratio that can be utilized for the target image 353. If the aspect ratio for the cropped image is acceptable, the cropped image is utilized as the target image 353 and/or the cropped image is fitted or resized to finalize the target image 353. The target image 353 is then stored in the target image set 352.

In some cases, the aspect ratios of cropped image may vary significantly from the aspect ratio corresponding to the target display specification 336. Thus, if the aspect ratio for the cropped image is not acceptable, then the content of the cropped image can be supplemented with additional pixel information to conform the cropped image with the desired aspect ratio.

Figure 6:
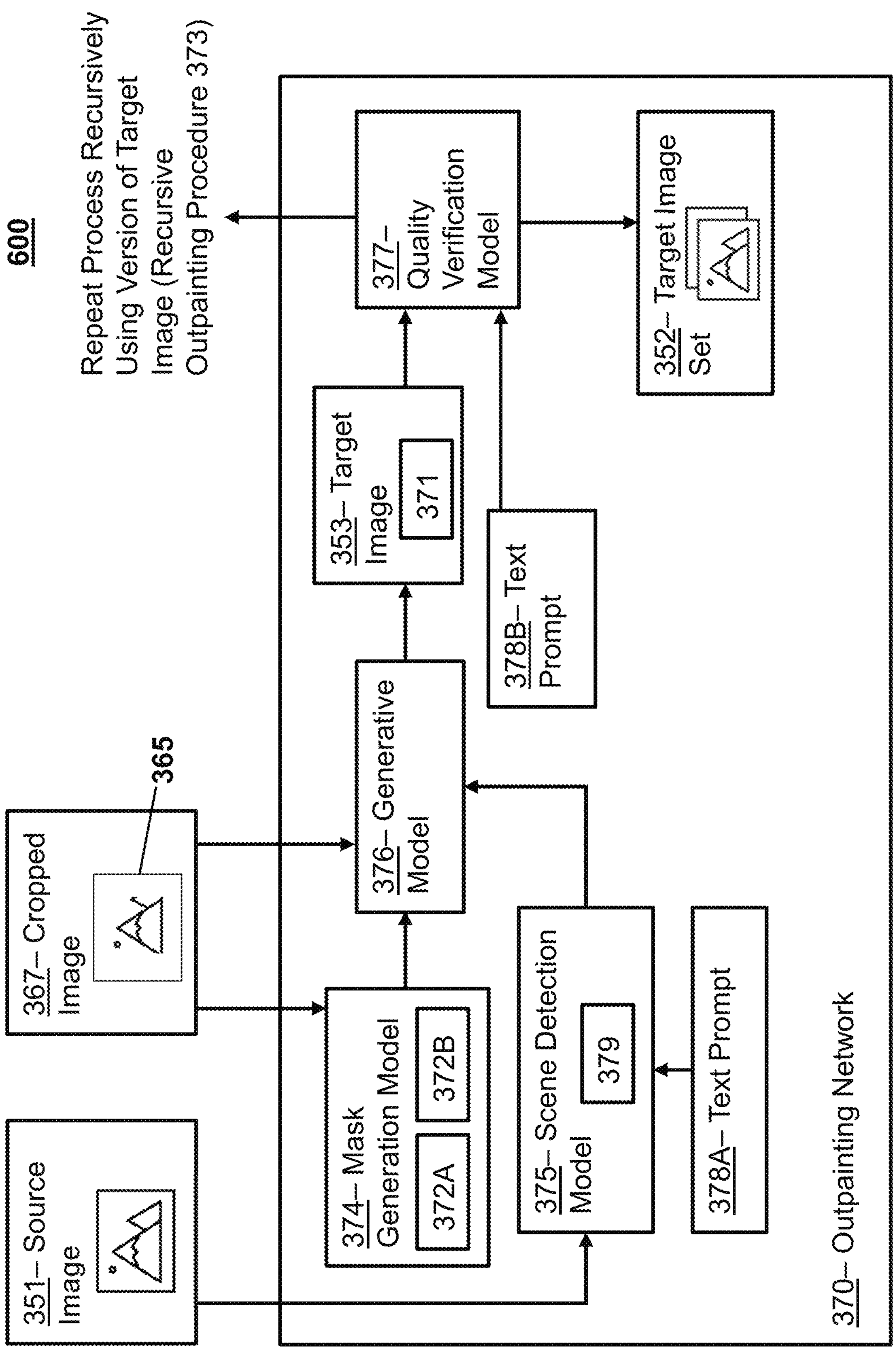
FIG. 6 is a diagram illustrating a process flow for an outpainting network according to an embodiment.

In process flow 500, there are two options for supplementing the pixel content of the cropped image containing the salient feature region 365. The first option is to incorporate a margin (e.g., a white margin) around the salient feature region 365 (e.g., around the top, bottom, left, and/or right sides) by using a margin adding function 368 to generate the target image 353. The second option is to utilize an outpainting network 370 to supplement the pixel content for the cropped image to generate the target image 353. In this scenario, the outpainting network 370 comprises a generative model that is adapted to generate pixel content for extending the scene or subject matter captured in the salient feature region 365. FIG. 6 (discussed below) provides further details on exemplary techniques that may be utilized by the outpainting network 370 to extend the salient feature region 365.

The target image 353 can be generated or finalized using either option mentioned above. The target image 353 can then be stored in, or associated with, the target image set 352. The process flow 500 can be repeated continuously until target images 353 have been generated for each of the target display specifications 336 associated with the electronic platform.

FIG. 6 is a diagram illustrating an exemplary process flow 600 for an outpainting network 370 according to certain embodiments. In this process flow 600, a generative model 376 receives a cropped image 367 comprising the salient feature region 365 which is output by the saliency resizing function described above, and supplements the cropped image 367 with supplemental pixel content 371 to generate a target image 353 (or at least an initial version of the target image 353 that is recursively refined later on in the process). In doing so, the generative model 376 utilizes a pair of guidance masks (372A and 372B) and a textual scene descriptor 379 as inputs to guide the pixel generation process. Further details of this process flow 600 are provided below.

The textual scene descriptor 379 received as an input to the generative model 376 provides a textual description of the scene or subject matter captured in a source image 351 (i.e., the source image 351 that was used to generate the cropped image comprising the salient feature region). In some examples, the textual scene descriptor 379 may include a textual string identifying objects (e.g., products, items, individuals, and/or other objects) in the source image 351 and/or identifying background in an image (e.g., an outdoor scene such as a garden or landscape, an indoor scene in a kitchen, etc.).

In certain embodiments, the outpainting network 370 may include a scene detection model 375 that is configured to generate textual scene descriptor 379 based on an analysis of the source image 351. The scene detection model 375 may include a large multi-modal (LMM) model that is adapted to process, analyze, and understand information for multiple modalities, including textual and image content. In some examples, the scene detection model 375 may be implemented using a BLIP-2 model or InstructBLIP model (which are developed by Salesforce®). Other models that are capable of analyzing both text and image content also may be utilized.

The scene detection model 375 may receive two: a) the source image 351 submitted for an electronic advertisement; and b) a textual prompt 378A that instructs the scene detection model 375 to generate a string describing a scene associated with the source image (e.g., "Describe the scene"). In some embodiments, the scene detection model 375 executes one or more natural language processing (NLP) tasks to understand the meaning of the textual prompt 378A, and one or more computer vision functions (e.g., object or image classification functions, object detection functions, etc.) to analyze the content of the source image 351 based on the meaning deduced form the textual prompt 378A. Based on an analysis of the source image 351, the scene detection model 375 may execute one or more NLP tasks (e.g., a text generation or summarization task) to generate and output the textual scene descriptor 379 that describes the scene or content of the source image 351 (e.g., "a garden", "a forest", "a factory", "a house", "a bedroom", etc.). The textual scene descriptor 379 can then be provided to the generative model 376 as an input to inform the process of generating the supplemental pixel content 371 for the target image 353.

As mentioned above, the generative model 376 also may receive guidance masks as inputs to aid in the generation of the supplemental pixel content 371. In this example, guidance masks 372A and 372B are generated by a mask generation model 374 associated with the outpainting network 370. Amongst other things, the guidance masks (372A and 372B) can inform the generative model 376 of which regions in the target image 353 need supplemental pixel content 371 and can inform the generative model 376 of the color scheme or information utilized by the salient feature region 365.

Figure 7A:
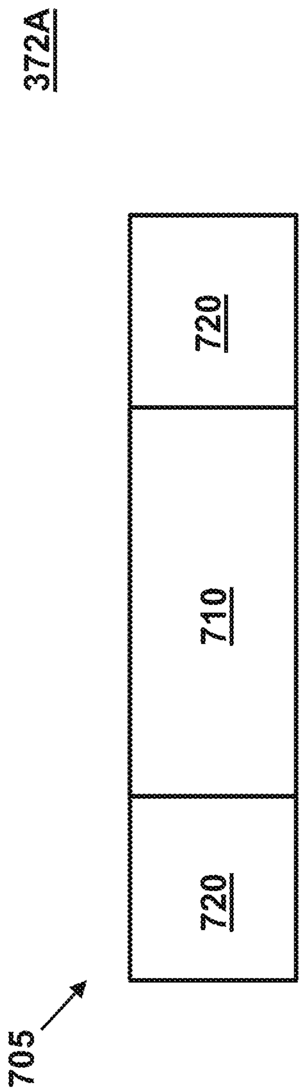
FIG. 7A is an illustration of a raw guidance mask according to an embodiment.
Figure 7B:
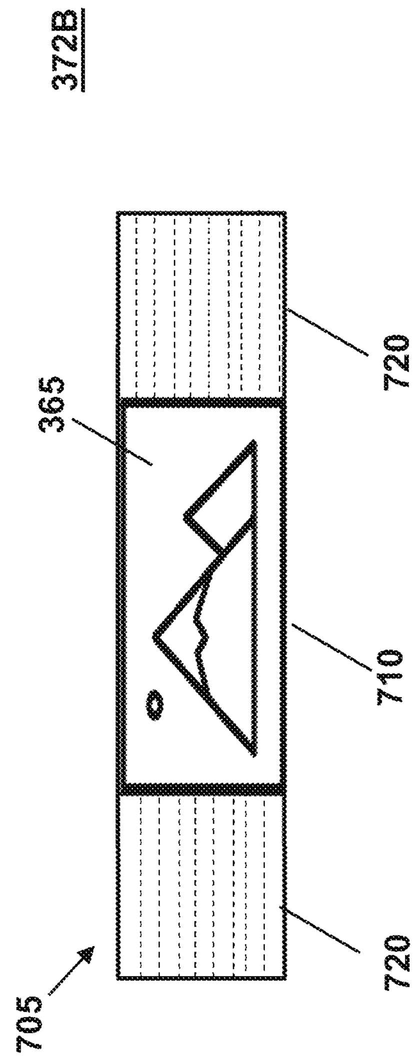
FIG. 7B is an illustration of a guidance mask according to an embodiment.

FIGS. 7A and 7B provide further details on how the mask generation model creates exemplary guidance masks. An initial size or aspect ratio 705 (or dimensions) for the guidance masks may be selected which extends the content of a cropped image containing the salient feature region in a horizontal and/or vertical direction. In some cases, the salient feature region may be centered vertically and/or horizontally within the guidance masks, or otherwise incorporated into within the guidance masks.

In FIG. 7A, a raw guidance mask 372A uses binary information (e.g., 0 or 1, black or white coloring, etc.) to identify a first region 710 of the mask where the salient feature region will be incorporated, and one or more second regions 720 of the mask 372A where supplemental pixel content is needed to extend the scene of the salient feature region. In this example, the raw guidance mask 372A comprises two second regions 720 where supplemental pixel content will be added by the generative model 376.

In FIG. 7B, a second guidance mask 372B is generated that provides information for naturally extending the salient feature region 365. The salient feature region 365 is incorporated into the first region 710 of the guidance mask 372B. The mask generation model may initially populate the second regions 720 with pixel content having color values derived from bordering regions of the salient feature region 365. These initial color values can inform the generative model of a color scheme to be utilized in generating the supplemental pixel content. The pixel content in the second regions 720 may be iteratively refined using a diffusion process executed by the generative model 376.

Returning to FIG. 6, the guidance masks (372A and 372B) generated by the mask generation model 374 can be provided as an input to the generative model 376, along with the textual scene descriptor 379 and/or the cropped image 367. The generative model 376 then utilizes these inputs to generate the pixel information for the regions identified by the guidance masks (372A and 372B), and outputs a target image 353 (or an initial version of the target image 353) having a new aspect ratio and additional pixel content.

Like the scene detection model 375, the generative model 376 can implemented using various generative models, such as a Stable Diffusion v2 model and/or an Imagen model developed by Google®. The generative model 376 utilizes both the text content associated with the textual scene descriptor 379 and the visual content associated with the guidance masks (372A and 372B) and/or cropped image 367 to generate the supplemental pixel content 371 for the target image 353. The supplemental pixel content 371 can be refined iteratively using a diffusion process that blends the supplemental pixel content 371 with the content of the salient feature region 365 in a manner that naturally extends the scene in the salient feature region 365.

Before the target image 353 is finalized or added to the target image set 352, a quality verification model 377 can be configured to perform quality control functions on the target image 353. Amongst other things, the quality verification model 377 can analyze the target image 353 (or current version of the target image 353) for any inconsistencies (e.g., such as undesired artifacts, edges, corners, or other features that can impact the aesthetic value of the target image 353). The quality verification model 377 (or other component) also may determine if the aspect ratio (or dimensions) of the target image 353 generated by the generative model 376 satisfy the display specifications 336 for the target image 353.

The quality verification model 377 also can implemented using a LMM model (e.g., a BLIP-2 model, InstructBLIP model, etc.) that is capable of analyzing both text and image content. In some embodiments, the quality verification model 377 performs the quality control functions using both image content of the target image 353 output by the generative model 376 and textual information included in a textual prompt 378B.

The textual prompt 378B received by the quality verification model 377 instructs the quality verification model 377 to output a binary answer indicating whether or not the scene associated with the target image 353 includes any inconsistencies. The quality verification model 377 generates a binary output (e.g., yes/no or 0/1) indicating whether the target image 353 includes inconsistencies. If any inconsistencies are detected, the target image 353 can be sent back to the generative model 376 for refinement.

The quality verification model 377 (or other component of the outpainting network 370) also may analyze the aspect ratio of the target image 353 for compliance with the display specifications 336 of the desired target image 353. If the aspect ratio is acceptable (and no inconsistencies are detected in the target image 353), the target image 353 may be finalized and/or added to the target image set 353.

On the other hand, if the aspect ratio of the target image 353 is not acceptable, a recursive outpainting function 373 can be applied to iteratively extend the target image 353 with supplemental pixel content 371 until it complies with the display specification 336. In each iteration of the recursive outpainting function 373, the current version of the target image 353 may be utilized as the initial cropped image 367. In generating the guidance masks (372A and 372B) for a current iteration, the current version of the target image 353 may be used as the salient feature region 365 to generate the guidance masks in the same manner described above. Each version of the guidance masks (372A and 372B) may include a larger size or extended aspect ratio, and may be utilized to guide the generative model 376 in further extending the pixel content of the scene in the target image 353 produced in the previous iteration. Additionally, for each iteration, the generative model 376 can utilize the diffusion process to blend the new supplemental pixel content 371 with scene in the previous iteration. Once the aspect ratio for the current version of the target image 353 is deemed to be acceptable (and no inconsistencies are detected), the target image is stored in the target image set 353.

Returning to FIGS. 3-4, in addition to using saliency-based cropping and/or outpainting techniques to generate target images 353, the image adaptation network 350 also may include a segmentation model 380 to manipulate or adapt the content of a source image 351 to produce one or more target images 353. In some examples, the segmentation model 380 can be configured to extract objects from the source image 351, such as prominent objects included in the detected salient feature region 365 of the source image 351. Additionally, the segmentation model 380 can be configured to remove background scenes in the source image 351. In creating a target image 353, the objects extracted by the segmentation model 380 can be incorporated into new scenes and/or supplemented with new backgrounds.

The segmentation model 380 can include or utilize various types of segmentation models including a InSPyReNet, a SAM model, and/or other appropriate model capable of performing segmentation functions. In some cases, the segmentation model 380 can be configured to perform dichotomous image segmentation techniques to separate objects from their backgrounds. Additionally, or alternatively, the segmentation model 380 can be configured with manual prompted segmentation functionalities in which users aid the segmentation model 380 in identifying objects to be segmented.

Figure 8:
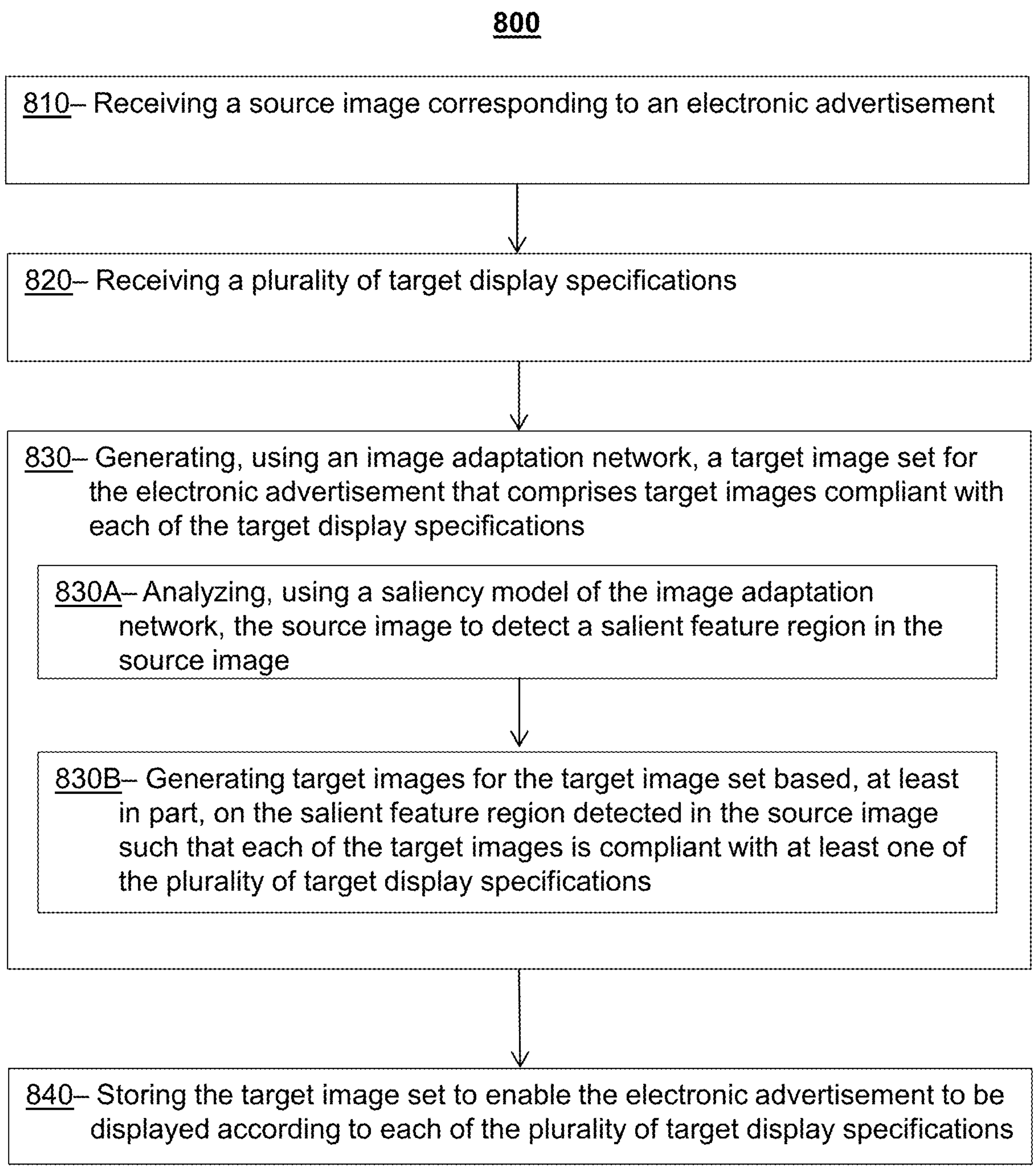
FIG. 8 is a flowchart for an exemplary method according to an embodiment.

FIG. 8 illustrates a flow chart for an exemplary method 800 according to certain embodiments. Method 800 is merely exemplary and is not limited to the embodiments presented herein. Method 800 can be employed in many different embodiments or examples not specifically depicted or described herein. In some embodiments, the steps of method 800 can be performed in the order presented. In other embodiments, the activities of method 800 can be performed in any suitable order. In still other embodiments, one or more of the steps of method 800 can be combined or skipped. In many embodiments, system 100, electronic platform 330, and/or image adaptation system 350 can be configured to perform method 800 and/or one or more of the steps of method 800. In these or other embodiments, one or more of the steps of method 800 can be implemented as one or more computer instructions configured to run at one or more processing devices and configured to be stored at one or more non-transitory computer storage devices. Such non-transitory memory storage devices can be part of a computer system such as system 100, electronic platform 330, and/or image adaptation system 350. The processing device(s) can be similar or identical to the processing device(s) 201 described above.

Step 810 of method 800 comprises receiving a source image corresponding to an electronic advertisement.

Step 820 of method 800 comprises receiving a plurality of target display specifications.

Step 830 of method 800 comprises generating, using an image adaptation network, a target image set for the electronic advertisement that comprises target images compliant with each of the target display specifications.

Step 830 can include a sub-step 830A comprising analyzing, using a saliency model of the image adaptation network, the source image to detect a salient feature region in the source image.

Step 830 can include a sub-step 830B comprising generating the target images for the target image set based, at least in part, on the salient feature region detected in the source image such that each of the target images is compliant with at least one of the plurality of target display specifications. Step 840 of method 800 comprises storing the target image set to enable the electronic advertisement to be displayed according to each of the plurality of target display specifications.

In many embodiments, the techniques described herein can provide a practical application and several technological improvements. In some embodiments, the techniques described herein can improve processes for deriving a target image set from a single source image. These techniques described herein can provide a significant improvement over conventional approaches for generating image sets, such as approaches that require a graphics designer to manually customize all images in a target image set.

In a number of embodiments, the techniques described herein can advantageously improve user experiences by automatically adapting, manipulating, and generating desired images that are compliant across heterogenous display specifications, which enables the user to obtain image sets that can be viewed in all display environments.

In a number of embodiments, the techniques described herein can solve a technical problem that arises only within the realm of computers, as machine learning models (such as the saliency model, generative model, scene detection model, and quality verification model described herein) do not exist outside the realm of computer networks.

Although systems and methods have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-8 may be modified, and that the foregoing discussion of certain of these embodiments does not necessarily represent a complete description of all possible embodiments. For example, one or more of the procedures, processes, or activities of FIG. 8 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

The invention claimed is:

1. A system comprising:

one or more processors; and one or more non-transitory computer-readable storage devices storing computing instructions that, when executed on the one or more processors, cause the one or more processors to perform functions comprising:

receiving a source image corresponding to an electronic advertisement;

receiving a plurality of target display specifications;

generating, using an image adaptation network and for the electronic advertisement, a target image set that comprises target images compliant with each of the plurality of target display specifications, wherein generating the target image set comprises:

analyzing, using a saliency model of the image adaptation network, the source image to detect a salient feature region in the source image; and generating a target image, of the target images, based, at least in part, on the salient feature region detected in the source image and using one or more of:

a guidance mask that identifies a region of the target image that requires supplemental pixel content, or a generative model, of the image adaptation network, to generate the supplemental pixel content based on a textual scene descriptor describing a scene of the source image, and wherein each of the target images is compliant with at least one of the plurality of target display specifications; and storing the target image set to enable the electronic advertisement to be displayed according to each of the plurality of target display specifications.

2. The system of claim 1, wherein the functions further comprise:

in response to receiving a request to display the electronic advertisement, identifying a target display specification, of the plurality of target display specifications, according to which the electronic advertisement will be displayed;

retrieving the target image from the target image set based on the target display specification; and transmitting the target image to a user computer for display.

3. The system of claim 1, wherein:

the saliency model is trained to identify the salient feature region in the source image;

the source image is received as an input to the saliency model; and the saliency model is configured to analyze the source image and generate an output identifying the salient feature region in the source image.

4. The system of claim 3, wherein:

a saliency resizing function receives the salient feature region output by the saliency model and a target display specification, of the plurality of target display specifications, for the target image; and the saliency resizing function crops the source image based on the target display specification in a manner that preserves the salient feature region in the source image.

5. The system of claim 1, wherein the image adaptation network comprises an outpainting network that is adapted to generate pixel content for at least one target image included in the target image set.

6. The system of claim 1, wherein:

the guidance mask identifies a first region of the target image that will include the salient feature region identified by the saliency model and a second region of the target image requires the supplemental pixel content;

the region of the target image is the second region of the target image; and the generative model is configured to generate the supplemental pixel content for the second region of the target image.

7. The system of claim 1, wherein the image adaptation network comprises an outpainting network that is configured to execute a recursive outpainting procedure that iteratively generates the supplemental pixel content for the second region of the target image.

8. The system of claim 1, wherein:

the image adaptation network comprises a scene detection model and the generative model;

the scene detection model is configured to analyze the source image and output the textual scene descriptor; and the generative model is configured to generate the supplemental pixel content using the textual scene descriptor.

9. The system of claim 1, wherein the plurality of target display specifications define different aspect ratios or dimensions for outputting the target images across heterogenous display environments associated with an electronic platform.

10. The system of claim 1, wherein the image adaptation network comprises one or more segmentation models that are configured to extract salient objects from the source image in generating one or more target images of the target images.

11. A method implemented via execution of computing instructions by one or more processors and stored on one or more non-transitory computer-readable storage devices, the method comprising:

receiving a source image corresponding to an electronic advertisement;

receiving a plurality of target display specifications;

generating, using an image adaptation network and for the electronic advertisement, a target image set that comprises target images compliant with each of the plurality of target display specifications, wherein generating the target image set comprises:

analyzing, using a saliency model of the image adaptation network, the source image to detect a salient feature region in the source image; and generating a target image, of the target images, based, at least in part, on the salient feature region detected in the source image and using one or more of:

a guidance mask that identifies a region of the target image that requires supplemental pixel content, or a textual scene descriptor describing a scene of the source image, and wherein each of the target images is compliant with at least one of the plurality of target display specifications; and storing the target image set to enable the electronic advertisement to be displayed according to each of the plurality of target display specifications.

12. The method of claim 11, wherein the method further comprises:

in response to receiving a request to display the electronic advertisement, identifying a target display specification, of the plurality of target display specifications, according to which the electronic advertisement will be displayed;

retrieving the target image from the target image set based on the target display specification; and transmitting the target image to a user computer for display.

13. The method of claim 11, wherein:

the saliency model is trained to identify the salient feature region in the source image;

the source image is received as an input to the saliency model; and the saliency model is configured to analyze the source image and generate an output identifying the salient feature region in the source image.

14. The method of claim 13, wherein:

a saliency resizing function receives the salient feature region output by the saliency model and a target display specification, of the plurality of target display specifications, for the target image; and the saliency resizing function crops the source image based on the target display specification in a manner that preserves the salient feature region in the source image.

15. The method of claim 11, wherein the image adaptation network comprises an outpainting network that is adapted to generate pixel content for at least one target image included in the target image set.

16. The method of claim 15, wherein:

the outpainting network utilizes the salient feature region to generate the guidance mask;

the guidance mask identifies the region of the target image that requires the supplemental pixel content; and a generative model associated with the outpainting network is configured to generate the pixel content for the region of the target image.

17. The method of claim 16, wherein the outpainting network executes a recursive outpainting procedure that iteratively generates the supplemental pixel content for the region of the target image, and wherein the pixel content is the supplemental pixel content.

18. The method of claim 16, wherein:

the outpainting network comprises a scene detection model and a generative model;

the scene detection model is configured to analyze the source image and output the textual scene descriptor; and the generative model is configured to generate the supplemental pixel content for at least based on the textual scene descriptor.

19. The method of claim 11, wherein the plurality of target display specifications define different aspect ratios or dimensions for outputting the target images across heterogenous display environments associated with an electronic platform.

20. The method of claim 11, wherein the image adaptation network comprises one or more segmentation models that are configured to extract salient objects from the source image in generating one or more target images of the target images.

* * * * *